Patented Feb. 27, 1923.

1,447,018

UNITED STATES PATENT OFFICE.

EDWIN D. FRIEDSAM, OF ALBANY, AND SOLON G. LONG, OF MOULTRIE, GEORGIA, ASSIGNORS TO NUTSBEST PACKING COMPANY, OF ALBANY, GEORGIA, A PARTNERSHIP OF GEORGIA.

PROCESS OF MAKING PECAN BUTTER.

No Drawing.   Application filed August 12, 1921.   Serial No. 491,843.

*To all whom it may concern:*

Be it known that we, EDWIN D. FRIEDSAM, a citizen of the United States, residing at Albany, in the county of Dougherty and State of Georgia, and SOLON G. LONG, a citizen of the United States, residing at Moultrie, in the county of Colquitt and State of Georgia, have invented certain new and useful Improvements in Process of Making Pecan Butter.

This invention relates to a process of producing pecan nut butter.

In the preparation of pecan nut butter from the meats of pecan nuts according to the present invention the meats are first removed from the shells of the nuts and assorted, or looked over in any desired manner to remove foreign particles.

The thus prepared meats are then placed in a suitable oven, or other appliance, and subjected to a degree of heat sufficient, and for a sufficient length of time to bring out the oil. The heat which is found necessary for this purpose ranges from approximately 165° F. to approximately 200° with the most usually required temperature nearer the maximum temperature stated than the minimum. A suitable temperature for most materials is about 190°. The time required is substantially ten minutes. The nuts of the product will be greatly affected by the difference of time and temperature to which the material is subjected, and for special purposes the time may be greater or less than that mentioned. Care must be exercised to keep the temperature below that of a roasting or parching degree, and which degree of temperature would destroy the natural flavor of the nuts and the value of the resulting product.

The material is next put through a machine of such a character as to pulverize the same. Apparently the pulverization takes place while the meats are in a heated condition, and all of the oil which is originally contained in the meats is retained in the finished product, the heating having modified the oil from its original finally divided condition as it exists in the natural product.

The product may be consumed as turned out by the pulverizing apparatus, or may be mixed with salt or other seasoning, according to the taste of the user, and is found to constitute a very palatable and nutritious food.

We claim:

1. The process of producing a pecan nut butter which comprises heating pecan nut meats to a degree sufficient to cause a portion of the oil thereof to appear on the surface of the nuts but not to a degree sufficient to roast or parch the same, and submitting the nuts to a pulverizing operation while in their heated condition.

2. The process of producing pecan nut butter which comprises heating pecan nut meats to a temperature of between 165 to 200° F. until a portion of the oil thereof appears upon the surface of the meats and subsequently pulverizing the thus treated material.

3. The process of producing pecan nut butter which comprises treating pecan nut meats to a temperature of between 165 to 200° F. for a period of substantially ten minutes and pulverizing the thus treated material while in a heated condition.

In testimony whereof we affix our signatures.

EDWIN D. FRIEDSAM.
SOLON G. LONG.